(12) United States Patent
Rossini

(10) Patent No.: US 7,621,544 B2
(45) Date of Patent: Nov. 24, 2009

(54) MOBILE FLAT PANEL MONITOR AND COMPUTER CART

(76) Inventor: Alfred P. Rossini, 1 Wyndemere Dr., Southborough, MA (US) 01772

(*) Notice: Subject to any disclaimer, the term of this patent is extended or adjusted under 35 U.S.C. 154(b) by 309 days.

(21) Appl. No.: 11/423,731

(22) Filed: Jun. 13, 2006

(65) Prior Publication Data

US 2007/0001413 A1   Jan. 4, 2007

Related U.S. Application Data

(60) Provisional application No. 60/689,835, filed on Jun. 13, 2005.

(51) Int. Cl.
  *B62B 1/00* (2006.01)
  *B62B 3/00* (2006.01)
  *A47B 81/00* (2006.01)
  *A47B 97/00* (2006.01)

(52) U.S. Cl. ............ 280/79.3; 280/47.34; 280/47.35; 312/223.2; 312/223.3; 312/223.6

(58) Field of Classification Search ............ 280/47.34, 280/47.35, 79.3; 312/223.3, 223.2, 223.6
See application file for complete search history.

(56) References Cited

U.S. PATENT DOCUMENTS

| | | | | |
|---|---|---|---|---|
| 5,673,632 A | * | 10/1997 | Sykes | 108/121 |
| D393,382 S | * | 4/1998 | Rutter et al. | D6/474 |
| 5,806,943 A | * | 9/1998 | Dell et al. | 312/223.3 |
| 5,918,841 A | * | 7/1999 | Sweere et al. | 248/123.11 |
| 6,086,315 A | * | 7/2000 | Poindexter et al. | 414/549 |
| 6,374,752 B1 | * | 4/2002 | Walser | 108/50.01 |
| D459,610 S | * | 7/2002 | Coonan et al. | D6/429 |
| 6,418,860 B1 | * | 7/2002 | Hinderhofer | 108/50.01 |
| 6,449,145 B1 | * | 9/2002 | Buller et al. | 361/683 |
| 6,493,217 B1 | * | 12/2002 | Jenkins, Jr. | 361/683 |
| 6,493,220 B1 | * | 12/2002 | Clark et al. | 361/686 |
| 7,009,840 B2 | * | 3/2006 | Clark et al. | 361/686 |
| D535,509 S | * | 1/2007 | Rossini et al. | D6/511 |
| 7,261,261 B2 | * | 8/2007 | Ligertwood | 248/129 |
| 7,401,796 B1 | * | 7/2008 | Greco | 280/47.35 |
| 2005/0017468 A1 | * | 1/2005 | Gallant et al. | 280/47.35 |
| 2005/0275178 A1 | * | 12/2005 | Huesdash et al. | 280/47.35 |

OTHER PUBLICATIONS

Design U.S. Appl. No. 29/242,661, filed Nov. 14, 2005 for Mobile Flat-Panel Monitor and Computer Cart.

* cited by examiner

*Primary Examiner*—Christopher P Ellis
*Assistant Examiner*—John R Olszewski
(74) *Attorney, Agent, or Firm*—Brian M. Dingman; Mirick, O'Connell, DeMallie & Lougee, LLP

(57) ABSTRACT

A mobile flat panel monitor and computer cart. The cart has a wheeled base, a support structure coupled to and extending above the base, a shelf coupled to the support structure above the base for supporting a computer, and a bracket coupled to the support structure above the shelf and that is adapted to have mounted to it a flat-panel monitor.

15 Claims, 4 Drawing Sheets

1

MOBILE FLAT PANEL MONITOR AND COMPUTER CART

CROSS-REFERENCE TO RELATED APPLICATION

This application claims priority of Provisional application Ser. No. 60/689,835, filed on Jun. 13, 2005, the disclosure of which is incorporated herein by reference.

FIELD OF THE INVENTION

This invention relates to a sturdy, multi-purpose mobile computer cart that carries a flat panel computer monitor.

BACKGROUND OF THE INVENTION

Mobile carts used as workstations are known. These carts are commonly used in medical facilitates and on manufacturing floors. They are typically adapted to carry a computer, and usually have additional shelf space available for the user, for such things as paper work, medications, and/or portable medical equipment. What they typically lack is any ability to securely carry a flat panel monitor so that they can act as s compact, portable workstation and a mobile video conferencing station.

SUMMARY OF THE INVENTION

This invention features a mobile flat panel monitor and computer cart. The cart has a wheeled base, a support structure coupled to and extending above the base, a shelf coupled to the support structure above the base for carrying a computer, and a bracket coupled to the support structure above the shelf and that is adapted to have mounted to it a flat-panel monitor.

The wheeled base may define a cavity that is adapted to hold a battery. The wheeled base may further comprise a cover over the cavity. The mobile flat panel monitor and computer cart may further comprise one or more retractable electrical cord spools, which can include at least a cord spool carrying a power cord, and a cord spool carrying a data cord.

The support structure may comprise a post. The post may define an interior channel. The post may further comprise a removable cover to provide access to the channel. The post may be adapted to carry a video camera. The post may define an opening proximate the shelf and communicating with the channel to allow routing of a cable from a device on the shelf into the channel.

The mobile flat panel monitor and computer cart may further comprise a second shelf member coupled to the post and defining a shelf surface. The second shelf member may carry a keyboard tray located below and spaced from the shelf surface. The mobile flat panel monitor and computer cart may further comprise a handle coupled to the support structure to allow a user to move the cart. The bracket may accomplish a VESA mount, which may be adjustable relative to the support structure.

BRIEF DESCRIPTION OF THE DRAWINGS

Other features, uses and advantages will occur to those skilled in the art from the following description of the preferred embodiment and the accompanying drawings, in which.

DESCRIPTION OF THE PREFERRED EMBODIMENT OF THE INVENTION

The disclosure of Provisional application Ser. No. 60/689,835, filed on Jun. 13, 2005 is incorporated herein by reference.

Figure 1:
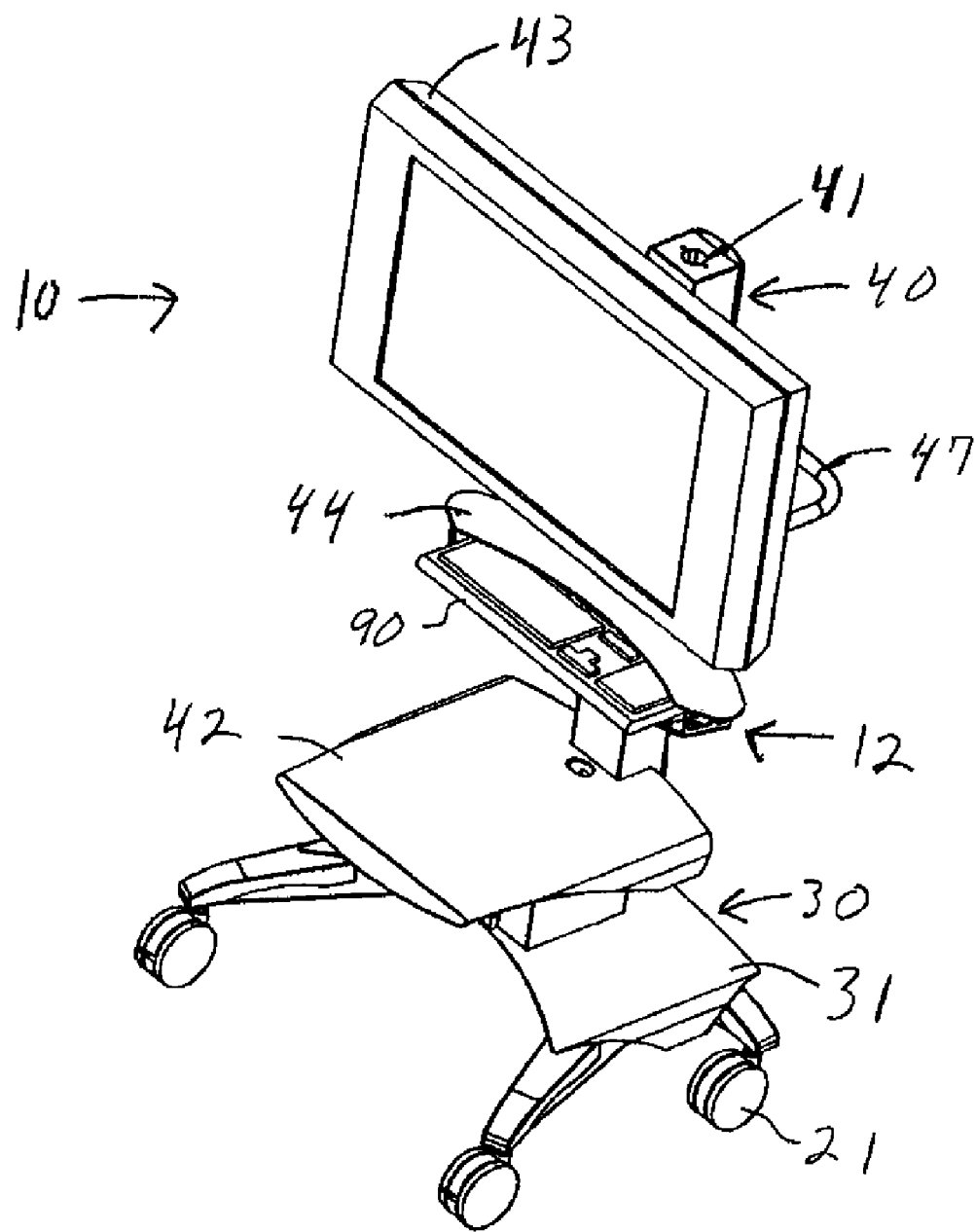
FIG. 1 shows the overall design of the preferred embodiment of the inventive cart.
Figure 2:
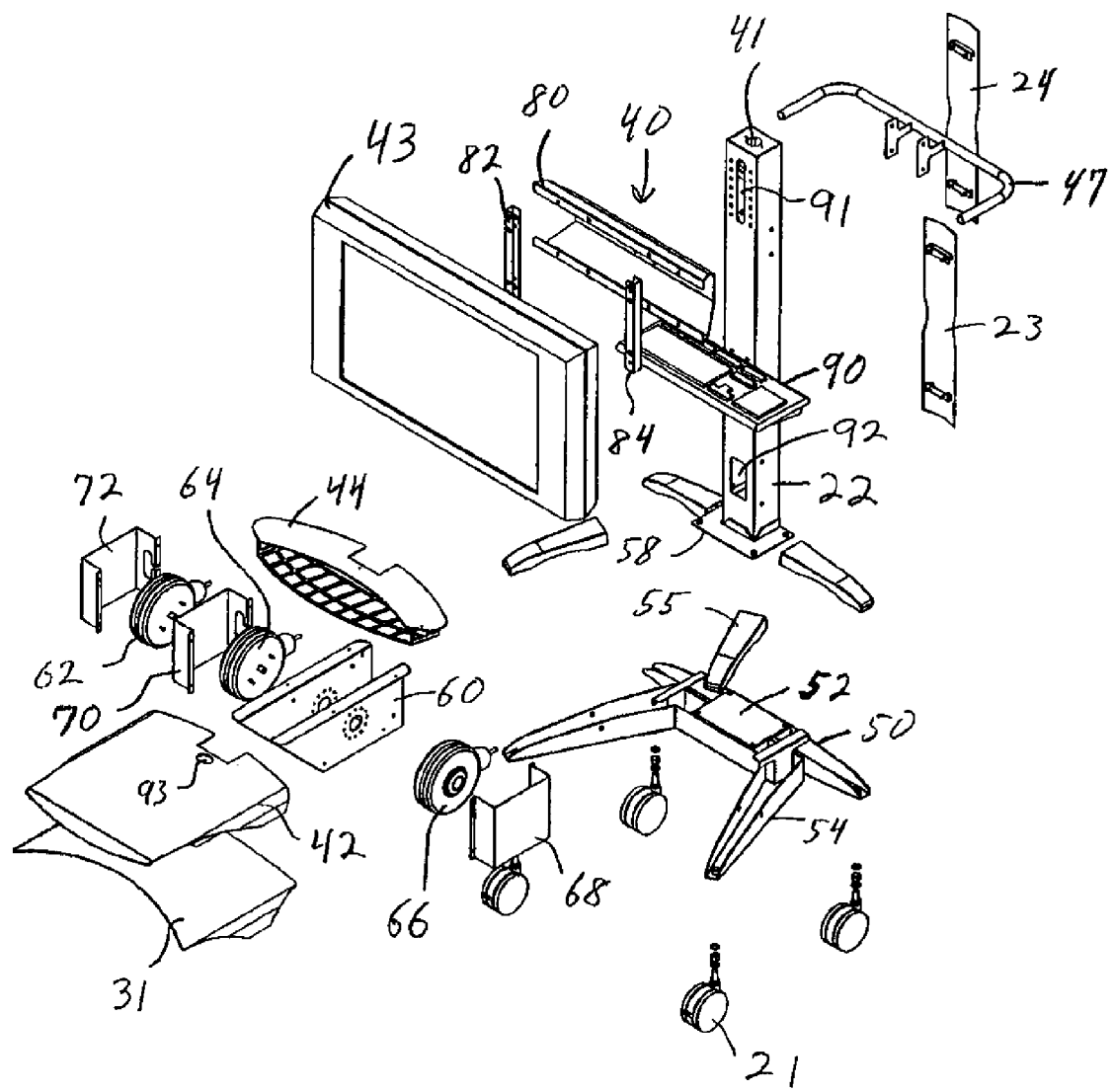
FIG. 2 is a detailed, exploded view of the cart of FIG. 1.
Figure 3:
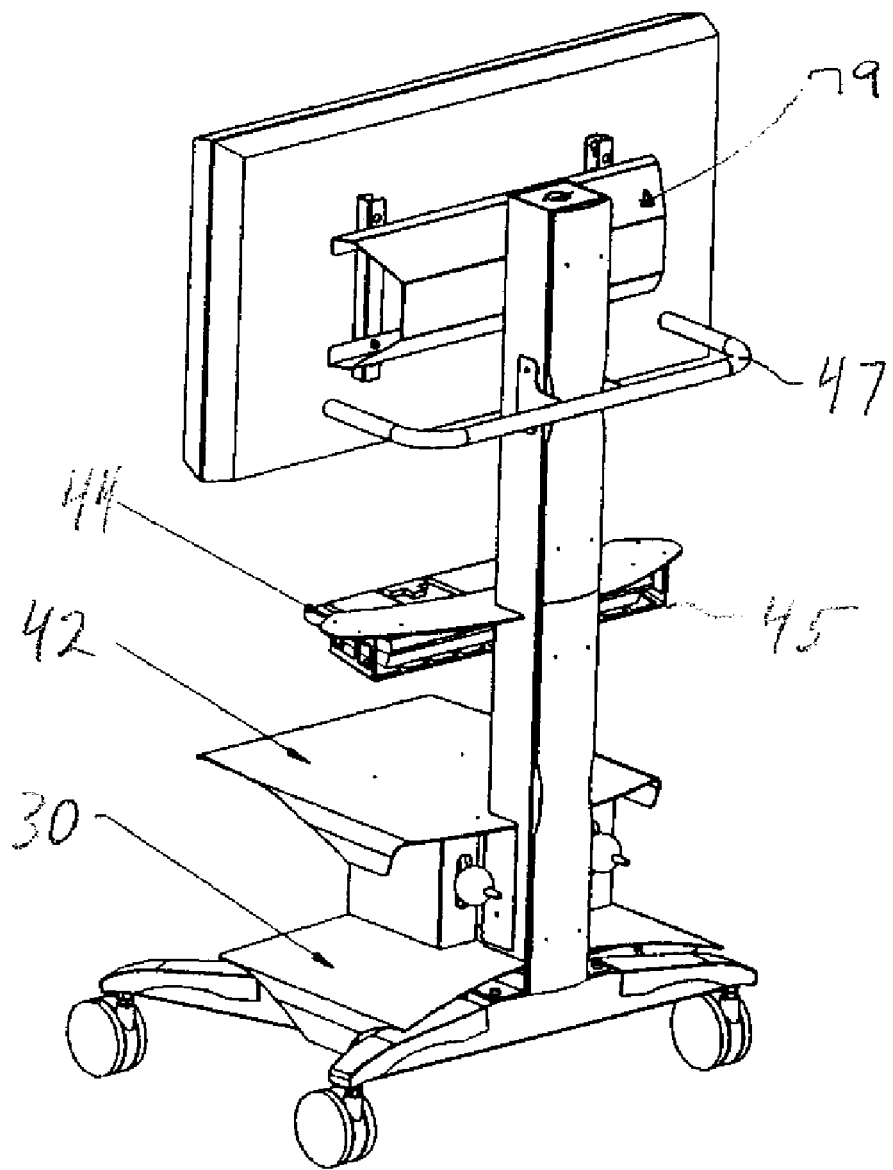
FIG. 3 is a rear isometric view of the cart of FIGS. 1 and 2.
Figure 4:
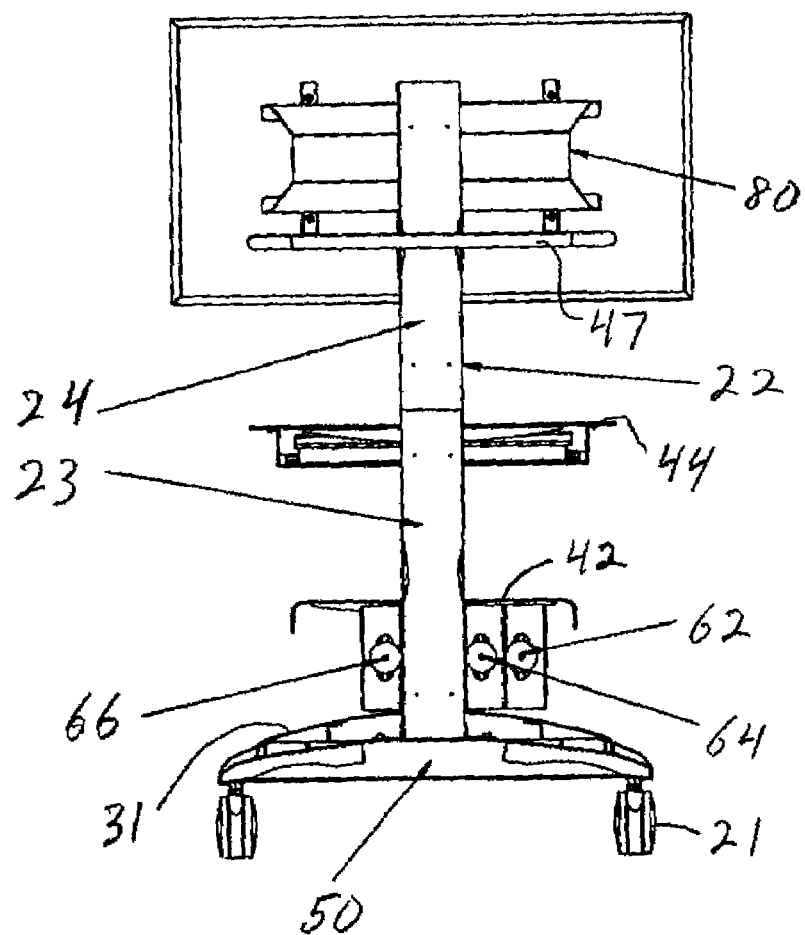
FIG. 4 is a rear elevational view of the cart of FIGS. 1-3.

This invention can be accomplished in a sturdy, multi-purpose mobile computer cart that carries a large flat panel monitor and that supports most computer hardware applications. FIGS. 1-4 show the construction of the preferred embodiment of the invention, in which FIG. 1 shows the overall design, FIG. 2 is a detailed, exploded view, FIG. 3 is a rear isometric view, and FIG. 4 is a rear elevational view.

The preferred embodiment of the inventive cart is constructed primarily of aluminum and cold rolled steel sheet metal. The metal is processed through turret punch machines and lasers to produce the shaped needed. The metal is formed in press brake machines and then a powder coat finish is applied. The finished parts are assembled and tested before shipping. The product is designed to be used with a variety of wired or wireless computing solutions such as, but not limited to, desktop computers, standard laptop computers, and thin client computers.

Wheeled mobile cart 10, FIGS. 1-4, comprises three main parts: wheeled base 30, intermediate section 12, and upper monitor mounting section 40. Base 30 carries a plurality of locking casters 21 that provide the mobility.

Large format monitor 43, which may be an LCD monitor, is carried on industry-standard VESA mount 79 comprising brackets 80, 82 and 84. Mount 79 is adapted to hold different size monitors. Bracket 80 is coupled to post 22 such that mount 79 can be pivoted up and down relative to post 22. Lower shelf 42 is fixed in this embodiment, but could be adapted to be vertically adjustable. The shelf is typically used to hold a computer. In this case, monitor 43 can be used as the computer monitor. Second shelf 44 preferably supports depending tray 45 that can hold computer keyboard 90. Keyboard 90 is preferably wireless, so that it can be removed from shelf 45 when used.

The major structural member of wheeled base 30 is member 50 that defined four arms 54 that each carry a caster 21. Covers 55 cover the cope tops of arms 54. Member 50 defines central cavity 52 that can carry a battery to provide battery backup and temporary battery-powered operation when the unit is unplugged from the wall outlet. Cover 31 covers the battery and member 50. Lower bracket 58 that supports post 22 bolts to member 50.

Post 22 is hollow to provide a cable management channel that is accessed by removable rear covers 23 and 24, which may be configured and mounted with clips that hold the covers slightly off the back of post 22, to leave a gap between the covers and the post that provides space for cables to enter and exit the cable management channel. The cables from the PC sitting on shelf 42 can be run through opening 93 and opening 92 as necessary to and from the power supply, monitor, mouse and a printer that could be remote or could be located on one of the shelves. Upper opening 91 allows a cable to be routed to monitor 43.

Shelf 42 is supported at two spaced locations by support 60. Support 60 also, in conjunction with cover members 68, 70 and 72 provides support for automatically retracting cable spools 62, 64 and 66 of the type known in the art that can accomplish a retractable power cord, a retractable coaxial cable, and a retractable LAN cable, for example. A power supply (not shown) can be included if desired; in this case the retractable power cord would feed into the power supply.

Shelf member 44 provides a surface for mouse operation and for the computer's speakers, as necessary. An antenna for wireless operation can also be located at this area. Opening 41 at the top end of post 22 is adapted to accept a video conferencing device or web camera so that the user of the cart can participate in video conferencing. Handle 47 is coupled to post 22 to provide easy access for movement of the cart without placing stress on monitor 42.

The invention offers mobile computing and television, as well as other office functions such as teleconferencing. The cart allows the user to move the system between locations by unplugging the unit using the retractable power cord. The PC and wireless devices are under battery backup power so there is no need to log out or shut down the system when the cart is moved.

Although specific features of the invention are shown in some drawings and not others, this is for convenience only, as the features can be combined as would be apparent to those skilled in the art, and as the claims set forth the rights granted under the patent. Other combinations of features would be apparent to those skilled in the art and are within the scope of the claims.

What is claimed is:

1. A mobile storage and computer cart, comprising:
   a wheeled base having a front and a back and comprising
      a generally rectangular center housing shaped to define a cavity that is adapted to hold a battery and comprising a bottom and a plurality of generally rectangular walls extending upwardly from the bottom, the plurality of generally rectangular walls including a front wall, a rear wall, and two opposed side walls, where the distal edges of the generally rectangular walls define a generally horizontal plane that is approximately coplanar with a generally horizontal plane defined by the top of the battery,
      a first pair of arms, one arm coupled to each side wall of the center housing proximate the rear wall of the center housing and extending in a direction generally parallel to the rear wall of the center housing;
      a second pair of arms, one arm coupled to each side wall of the center housing proximate the front wall of the center housing and extending in a direction generally perpendicular to the front wall of the center housing,
      a wheel coupled to the distal end of each arm, and
      a cover for closing the cavity, where at least a portion of the cover extends over at least a portion of each of the arms;
   a support structure coupled to the back of the wheeled base proximate the rear wall of the center housing and extending above the base;
   a first shelf coupled to the support structure above the base by a pair of generally rectangular, parallel shelf support members, for supporting at least a computer;
   at least one cord spool coupled to the pair of shelf support members and positioned below the first shelf;
   a second shelf coupled to the support structure above the first shelf, for supporting at least a mouse;
   a tray coupled to the second shelf, for supporting at least a keyboard; and
   a mechanical structure coupled to the support structure above the second shelf and that is adapted to have a flat-panel monitor mounted to it.

2. The mobile flat panel monitor and computer cart of claim 1 where the at least one cord spool is a retractable electrical cord spool.

3. The mobile flat panel monitor and computer cart of claim 1 comprising at least a cord spool carrying a power cord and a cord spool carrying a data cord.

4. The mobile flat panel monitor and computer cart of claim 1 wherein the support structure comprises a post.

5. The mobile flat panel monitor and computer cart of claim 4 wherein the post defines an interior channel.

6. The mobile flat panel monitor and computer cart of claim 5 wherein the post further comprises a removable cover to provide access to the channel.

7. The mobile flat panel monitor and computer cart of claim 6 wherein the post is adapted to carry a video camera.

8. The mobile flat panel monitor and computer cart of claim 5 wherein the post defines an opening proximate the first shelf and communicating with the channel to allow routing of a cable from a device on the first shelf into the channel.

9. The mobile flat panel monitor and computer cart of claim 1 further comprising a handle coupled to the support structure to allow a user to move the cart.

10. The mobile flat panel monitor and computer cart of claim 1 wherein the mechanical structure comprises a VESA mount.

11. The mobile flat panel monitor and computer cart of claim 10 wherein the VESA mount is adjustable relative to the support structure.

12. A mobile flat panel monitor and computer cart comprising:
    a wheeled base having a front and a back and comprising
       a generally rectangular center housing shaped to define a cavity that is adapted to hold a battery and comprising a bottom and a plurality of generally rectangular walls extending upwardly from the bottom, the plurality of generally rectangular walls including a front wall, a rear wall, and two opposed side walls, where the distal edges of the generally rectangular walls define a generally horizontal plane that is coplanar with a generally horizontal plane defined by the top of the battery,
       a first pair of arms, one arm coupled to each side wall of the center housing proximate the rear wall of the center housing and extending in a direction generally parallel to the rear wall of the center housing;
       a second pair of arms, one arm coupled to each side wall of the center housing proximate the front wall of the center housing and extending in a direction generally perpendicular to the front wall of the center housing, and
       a wheel coupled to the distal end of each arm;
    a cover for closing the cavity, where at least a portion of the cover extends over at least a portion of each of the arms;
    a post coupled to the back of the wheeled base proximate the rear wall of the center housing and extending above the base, the post defining an interior channel;
    a first shelf coupled to the post above the base by a pair of generally rectangular, parallel shelf support members, for supporting a computer;
    a second shelf coupled to the post above the first shelf, for supporting a mouse;
    a tray coupled to the second shelf, for supporting a keyboard;
    an adjustable VESA mount coupled to the post above the second shelf and that is adapted to have a flat-panel monitor mounted to it; and
    a handle coupled to the post to allow a user to move the cart.

13. The mobile flat panel monitor and computer cart of claim 12 wherein the post further comprises a removable cover to provide access to the channel.

14. The mobile flat panel monitor and computer cart of claim 13 wherein the post is adapted to carry a video camera.

15. The mobile flat panel monitor and computer cart of claim 12 wherein the post defines an opening proximate the first shelf and communicating with the channel to allow routing of a cable from a device on the first shelf into the channel.

* * * * *